United States Patent [19]
Baker et al.

[11] Patent Number: 5,150,209
[45] Date of Patent: Sep. 22, 1992

[54] HIERARCHICAL ENTROPY CODED LATTICE THRESHOLD QUANTIZATION ENCODING METHOD AND APPARATUS FOR IMAGE AND VIDEO COMPRESSION

[75] Inventors: Richard L. Baker, Belmont; Jeffrey Bernstein, Marblehead; Bernd Girod, Boston; Xiancheng Yuan, Bedford; Edmund Thompson, Burlington, all of Mass.

[73] Assignee: PictureTel Corporation, Peabody, Mass.

[21] Appl. No.: 698,396

[22] Filed: May 10, 1991

Related U.S. Application Data

[63] Continuation of Ser. No. 522,602, May 11, 1990.

[51] Int. Cl.$^5$ ............................................. H04N 7/12
[52] U.S. Cl. .................................. 358/133; 358/135; 358/136
[58] Field of Search ............... 358/133, 135, 136, 105, 358/138; 375/31, 122, 39, 42; 382/56

[56] References Cited

U.S. PATENT DOCUMENTS

| | | | |
|---|---|---|---|
| 4,661,849 | 4/1987 | Hinman | 358/138 |
| 4,703,350 | 10/1987 | Hinman | 358/133 |
| 4,718,104 | 1/1988 | Anderson | 358/133 |
| 4,727,422 | 2/1988 | Hinman | 358/133 |
| 4,774,455 | 12/1988 | Ericsson | 358/135 |
| 4,816,914 | 3/1989 | Ericsson | 358/135 |
| 4,849,810 | 7/1989 | Ericsson | 358/136 |
| 4,864,396 | 9/1989 | Martens | 358/133 |
| 4,959,842 | 9/1990 | Forney, Jr. | 375/39 |

*Primary Examiner*—James J. Groody
*Assistant Examiner*—Michael L. Lee
*Attorney, Agent, or Firm*—Hale and Dorr

[57] ABSTRACT

A method and apparatus for encoding interframe error data in an image transmission system, and in particular in a motion compensated image transmission system for transmitting a sequence of image frames from a transmitter to a receiver, employ hierarchical entropy coded lattice threshold quantization to increase the data compression of the images being transmitted. The method and apparatus decimate an interframe predicted image data and an uncoded current image data, and apply hierarchical entropy coded lattice threshold quantization encoding to the resulting pyramid data structures. Lossy coding is applied on a level-by-level basis for generating the encoded data representation of the image difference between the predicted image data and the uncoded original image. The method and apparatus are applicable to systems transmitting a sequence of image frames (or other pattern data, such as speech) both with and without motion compensation.

58 Claims, 7 Drawing Sheets

HIERARCHICAL ENTROPY CODED LATTICE THRESHOLD QUANTIZATION ENCODING METHOD AND APPARATUS FOR IMAGE AND VIDEO COMPRESSION

BACKGROUND OF THE INVENTION

This is a continuation of U.S. application Ser. No. 07/522,602, filed May 11, 1990.

The invention relates generally to data communication and signal processing methods and apparatus, and in particular to a method and apparatus for reliably and efficiently encoding and decoding sequences of image data, for example, that transmitted over a telephone communications channel.

The transmission of sequences of images, and in particular sequences of naturally occurring images such as those represented by a television signal, continues to be the subject of a significant amount of investigation. Typically, investigators have relied upon the highly redundant nature of successive images in the sequence and have often modeled the image data as a Markov process with a correlation coefficient close to unity. The three-dimensional Markov model provides a motivation for utilizing differential pulse-code-modulation (DPCM) and transform coding techniques to take account of the interframe redundancy.

By analyzing the nature of typical moving video, it is easy to become convinced that the principal change occurring between successive frames is the inhomogeneous motion of the objects within the frame. It has also been recognized that an accurate apparatus and method of estimating and compensating for this spatially dependent motion enables the construction of an interframe data compression method and apparatus which can have substantially better performance than can be achieved by sending a signal representative merely of the difference between successive frames.

As a result, various motion compensating coding methods and apparatus have been developed. These systems typically are either receiver-based motion compensation systems or transmitter-based motion compensation systems. In the receiver-based motion compensation system, the receiver makes a prediction as to the motion and compensates the previous frame for the expected motion. The transmitter, operating in the same manner, then sends only an error signal describing what must be done at the receiver in order to correct the receiver predicted frame. The error signal is typically coded to reduce its bandwidth.

For a transmitter-based motion compensation system, the motion estimation process occurs only at the transmitter. Displacement vectors are generally determined over various regions of the image and this data is then transmitted to the receiver along with an error information data signal. At the receiver, the compensation process is performed on the previously coded image first using the motion information provided by the transmitter. The error signal data provided by the transmitter is then added to ted receiver image in order to maintain picture quality.

There is thus typically provided for a transmitter-based motion compensation system a plurality of displacement vectors, and in at least one preferred embodiment, each vector is associated with a specific region or block of the image. The blocks are typically non-overlapping and have, for example, a size of eight picture elements (pixels) by eight picture elements. Various methods have been employed for encoding the motion compensation data associated with each of the blocks.

Many methods have also been employed for encoding the error information data signal in a transmitter-based motion compensation system. For example, in Hinman, U.S. Pat. No. 4,727,422, a lossy compression method and apparatus are disclosed. While these methods are highly advantageous, and provide excellent results, it is nevertheless desirable to further improve the compression of the data information and thereby enable high quality image reproduction using still less channel bandwidth. It is further desirable to provide better control over the data transmission by controlling, for example, the bit rate associated with the image.

Often, during a scene change, for example, there exists substantial information to be transmitted, so that during a single frame time, insufficient bandwidth is available to transmit all of the information. Accordingly, various methods have been implemented to selectively limit the number of bits of information transmitted over the channel. One of these methods, described in Ericsson, U.S. Pat. No. 4,816,914, filed Jan. 7, 1987, entitled "A Method and Apparatus for Efficiently Coding and Decoding Image Sequences," employs quad-tree coding in connection with the transmission of portions of a transform coefficient data set. The quad-tree coding advantageously provides a more graceful degradation of the image during heavy motion or scene changes. The contents of the Ericsson, U.S. Ser. No. 001,326, filed Jan. 7, 1987, are incorporated herein, in their entirety, by reference.

Other methods, such as hierarchical vector quantization, disclosed in Ericsson, U.S. Pat. No. 4,849,810 provide other advantages in the encoding process. The contents of Ericsson, U.S. Pat. No. 4,849,810 are incorporated herein, in their entirety, by reference.

Other encoding methods have been used for encoding source data. In particular, lattices have been studied for some time in the literature for channel and source coding applications. Much of that work has been summarized in an encyclopedic monograph on lattice theory and applications. While most of the current work in data compression uses Generalized Lloyd Vector Quantizers (VQ), several researchers have recently labored to revive interest in lattice quantization (LQ).

Both lattice and vector quantization map a multidimensional space into a finite or countable set of points. In vector quantization, as described in Ericsson, U.S. Pat. No. 4,849,810, a codebook containing a finite set of points is constructed by some training method or analysis. Each source vector is quantized by locating the "closest" point (or codevector) in the codebook, as measured by some distortion criterion. For example, a squared error criterion (L-2 norm), can be used, although other measures are equally valid. The encoder transmits the index of this codevector to the receiver, which then approximates the source vector during reconstruction, with the codevector.

A lattice is defined as a finite set of points and all possible linear translates of it, yielding a (typically) countable but infinite set of points. A source vector can be quantized in accordance with lattice quantization by locating the closest point to it, that is contained in the lattice, as measured by some distortion criterion (for example a squared error criterion). Assuming the lattice can be indexed (counted) by some method, the lattice point's index is transmitted and the receiver approximates the source vector with that lattice point.

It is therefore an object of the present invention to transmit sequences of images over a communications channel using lattice quantization encoding, achieving relatively low bandwidth, and providing high reliability and fidelity. Another object of the invention is to control the number of bits employed to transmit each image of a sequence of images while providing for graceful degradation of the image during a scene change or during periods of heavy motion. Other objects of the invention are a motion compensation encoding and decoding method and apparatus which reliably transmit and receive an accurate estimate of the displacement error in a scanned image in a sequence, and an improved motion estimation error encoding and decoding method and apparatus which enable real-time, accurate determination of regional displacement in an image transmission device.

SUMMARY OF THE INVENTION

The invention relates to a method and apparatus for encoding interframe error data in an image transmission system, and in particular, in a motion compensation image transmission system, for transmitting a sequence of image frames from a transmitter station to a receiver station. The method features the steps of decimating an interframe predicted image data representing a prediction of the current image frame for generating a prediction pyramid data structure representing the current image prediction and having a plurality of decimation levels; decimating an uncoded current image data representing the current uncoded image frame for generating a current image pyramid data structure representing the current image and having the plurality of decimation levels; and applying an entropy coded, lattice threshold quantization encoding method to the difference of the prediction and current image pyramid data structures, on a level by level basis, for generating an encoded data representation of the difference between the predicted image data and the uncoded current image data.

In other aspects, the method features the steps of applying the lattice encoding method to the data structures of a level on a block-by-block basis using an E-8 lattice structure.

In another aspect of the invention, the method features the steps of forming a difference image representing, on a pixel-by-pixel basis, the difference between a predicted image data for a current image frame and an uncoded current image data representing the uncoded current image frame. The method further features decimating the difference image for generating a difference image pyramid data structure having a plurality of decimation levels and selectively applying the lattice quantization encoding to the difference image pyramid data structure on a level-by-level basis for generating an encoded data representation of the difference between the predicted image data and the uncoded current image data. In a particular aspect, the method features forming the predicted image data using interframe motion compensation.

The apparatus of the invention features circuitry for decimating the interframe predicted image data for a current image frame for generating the prediction pyramid data structure having a plurality of decimation levels, circuitry for decimating the uncoded current image data representing the current uncoded image frame for generating a current image pyramid data structure having the plurality of decimation levels, and circuitry for applying entropy coded lattice threshold quantization encoding to the prediction and current image pyramid data structures on a level-by-level basis for generating an encoded data representation of the difference between the predicted image data and the encoded current image data. The apparatus further features circuitry for applying the lattice encoding method to the data structures of a level on a block-by-block basis using an E-8 lattice.

In yet another aspect of the invention, the apparatus for encoding the interframe error data in an image transmission system for transmitting a sequence of image frames features circuitry for forming a difference image representing, on a pixel-by-pixel basis, the difference between predicted image data for a current image frame and an uncoded current image data representing an uncoded image frame. Decimation circuitry is provided for decimating the difference image; for generating a difference image pyramid data structure having a plurality of decimation levels; and for applying entropy coded, lattice threshold quantization encoding to the difference image pyramid data structure on a level-by-level basis for generating an encoded data representation of the difference between the predicted image data and the encoded current image data.

BRIEF DESCRIPTION OF THE DRAWINGS

Other objects, features, and advantages of the invention will appear from the following description of particular preferred embodiments taken together with the drawings in which.

DESCRIPTION OF THE PARTICULAR PREFERRED EMBODIMENTS

Figure 1:
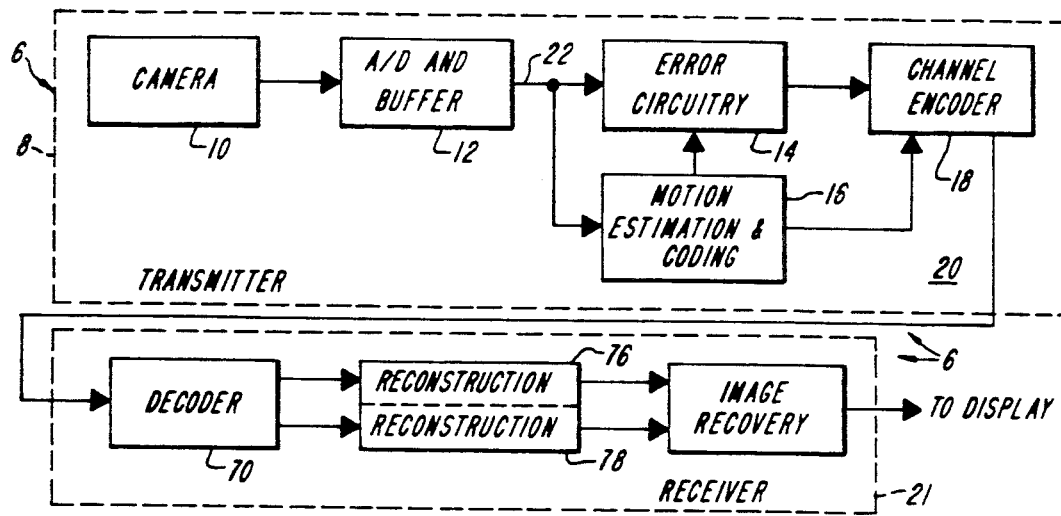
FIG. 1 is an electrical block diagram of a typical image communications system in accordance with the claimed invention.

Referring to FIG. 1, a communications system 6 has a transmitter 8 which, in accordance with a preferred embodiment of the invention, has a camera 10 for providing a video signal to an analog-to-digital converter and frame buffer 12. The frame buffer portion of the analog-to-digital converter and frame buffer 12 is capable of storing a full frame of the video, sampled to, for example, eight bits across a 256×240 pixel raster.

The entire coding and motion compensation process takes place in the digital domain. The transmitter has an error signal circuitry 14 and a motion estimation and coding circuitry 16. A channel encoder 18 channel encodes the outputs of the error circuitry 14 and motion estimation and coding circuitry 16 and passes the thus encoded data onto a channel 20 for transmission to a receiver 21.

Figure 2:
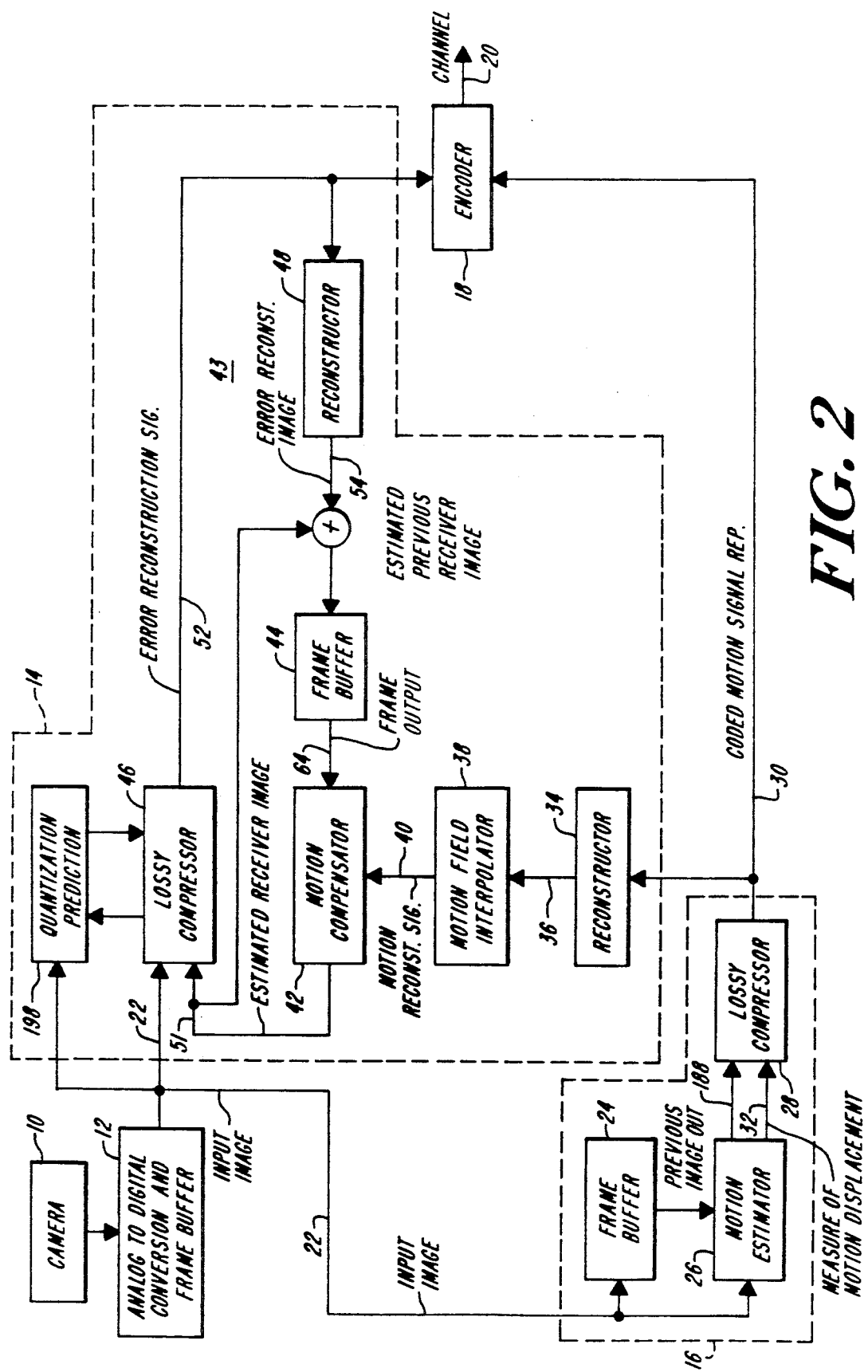
FIG. 2 is an electrical block diagram of the transmitter of a motion-compensated image encoding apparatus employing the invention.

The illustrated motion estimation and coding circuitry 16 of FIG. 1, in accordance with a preferred embodiment of the invention, and referring to FIG. 2, compares a present original input frame image, available over lines 22, with the previous original input image, available in this illustrated embodiment from a frame buffer 24. A motion estimator circuitry 26 generates a measure of the motion displacement between the frames input thereto, and can be any of a number of motion estimation devices as are well known in the art. In a preferred embodiment to be described hereinafter, the motion estimation device uses an adaptive steepest descent error minimization method to generate the motion displacement measures as described in Hinman, U.S. Pat. No. 4,661,849, the contents of which are incorporated herein, in their entirety, by reference.

The output of the motion estimator 26 is a field of motion vectors which, as noted above, provide a measure of the motion displacement between input frames. This vector field provides a description of how to map a previous input frame or input image from buffer 24 into the best approximation of the present input frame or image over lines 22. (Preferably buffer 24 contains only 32×30 and 64×60 decimated copies of the previous image, while a buffer 44 is used for deriving a 128×120 copy of the previously (estimated) image.) By "best" is meant an error metric such as, for example, a mean-squared-error error measure. Typically, and in the illustrated embodiment, the motion estimator uses a region matching technique between non-overlapping blocks of the previous and present input images. Should motion occur for a region in the present image, the estimator will determine which block in the previous image is the best match for the block in the present image, and the value of the displacement is the difference between a new coordinate pair for the block in the present image and the original coordinate pair for the block in the earlier image. That determination defines the motion vector to be associated with the block in the present image.

Since scenes are generally composed of several large objects moving uniformly over time, there is a high degree of correlation in the motion vector field. To avoid transmitting redundant information, and to reduce the data bit requirements, the preferred embodiment of the invention modifies the motion vector field, thereby losing some information, to facilitate the compression of the motion representing data. In the illustrated embodiment, this operation is represented by a "lossy compressor" 28 which reduces the amount of data, and hence the bandwidth, required to represent the motion vector field. Noting the similarity between motion vector field and natural images, predictive, transform, or interpolative coding of the two independent components of the vector field can be employed by the lossy compressor 28.

Thus the lossy compressor circuitry 28 is employed for coding the motion vector field available over lines 32, and provides, over lines 30, a coded motion signal representative of the motion vectors. This output of the lossy compressor, as noted above, will not, upon decoding, exactly reproduce the signals over lines 32 (which provide the measure of motion displacement) and, therefore, have some error signal associated with them. Nevertheless, the reduction in the data requirements of a lossy compressor, when compared to, for example, a PCM exact coding method, are so substantial, that the use of a lossy compressor, is a significant advance in the art. One preferred lossy compression circuitry employs adaptive predictive pulse coded modulation (ADPCM).

Figure 3:
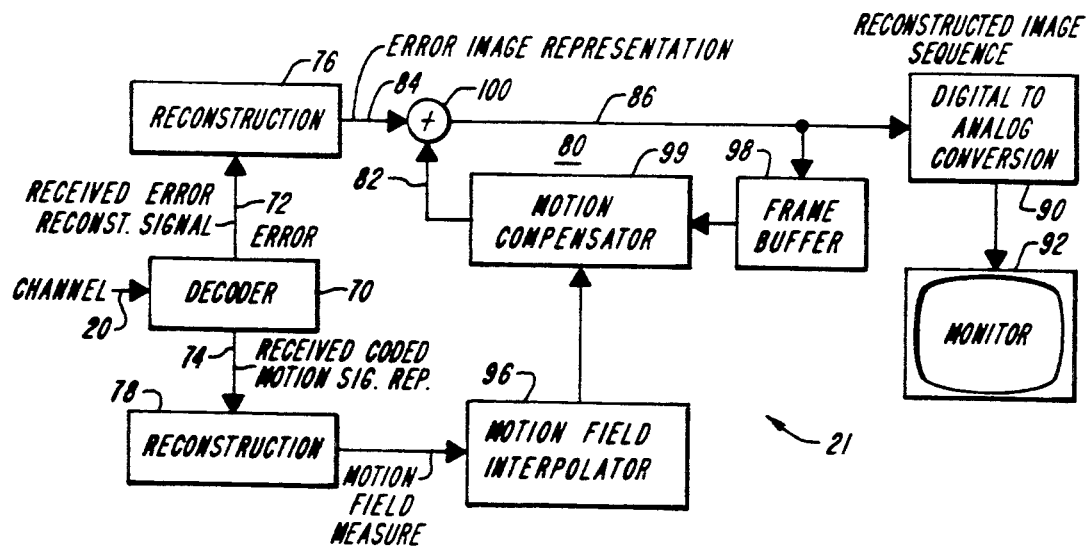
FIG. 3 is an electrical block diagram of the receiver of a motion-compensated image encoding system for receiving the channel signals from the transmitter of FIG. 2.
Figure 3A:
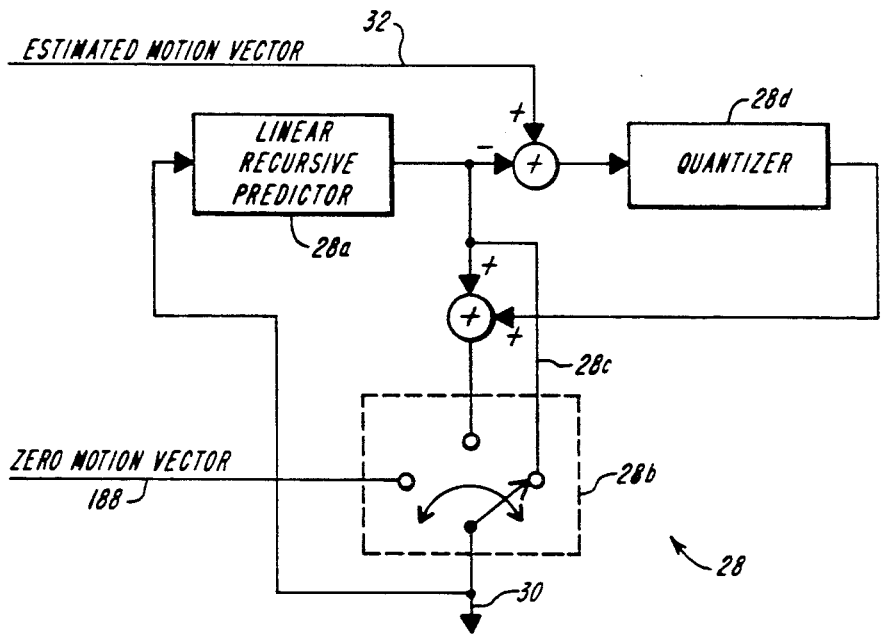
FIG. 3A is a block diagram of the lossy compressor 28 according to the invention.
Figures 7, 8, 8A:
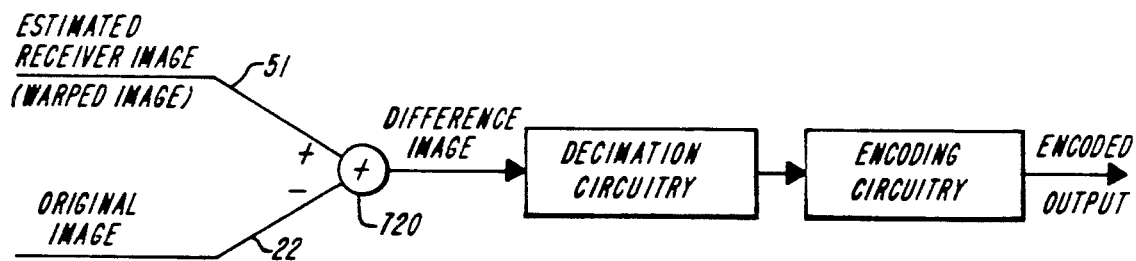
FIG. 7 is a general block diagram of an alternate embodiment of lossy compressor according to one aspect of the invention.
FIG. 8 is a diagrammatic representation of the relative locations of adjacent blocks used in predicting a next block value.
FIG. 8A is a diagrammatic representation of the relative locations of adjacent motion vectors used in the linear predictor.

Referring to FIG. 3A, the lossy compressor circuitry 28, in the illustrated embodiment of the invention, provides for a linear predictor 28a of the motion vector field and includes additional circuitry for reducing the number of bits (the bandwidth) required to describe the predictor and prediction error of the motion vector field. Referring to the raster scanning pattern as shown in FIG. 8A, and to FIG. 3A, the linear predictor 28a predicts the current motion vector (marked X) using the four previously coded neighbors (marked 0) (previously available over lines 30). Then additional circuitry (embodied in switch circuitry 28b) makes a decision regarding three possible choices:

a) Reset the estimated motion vector to zero (the signals over line 188) and send it to the receiver;

b) Reset the estimated motion vector (over line 28c) to the predicted value and send it to the receiver; or c) Quantize the prediction error (the difference between the original estimated motion vector and the predicted motion vector) in quantizer 28d and send the quantization index to the receiver.

Associated with each choice, there is an incurred cost (the bits N used to transmit that decision) and an error E (the mean squared error of the difference image block generated by using chosen motion vector). The additional circuitry 28b makes this decision using an entropy constrained error measure, that is, a weighted combination of the used bits and error (for example, a measure equal to $(aN+bE)$ where "a" and "b" are constants experimentally determined for the apparatus). The result that produces the smallest entropy constrained error is chosen and transmitted. The encoding process starts by sending one bit of information about whether or not to reset the estimated motion vector to zero. If it is reset to zero, nothing more is sent for this motion vector. Otherwise, a second bit of information is sent to tell the receiver whether to use only the predicted motion vector or whether additional correctional information (the quantized error) will be sent. Finally, if correctional information is needed, the quantization index of the prediction error will be sent. In order to further reduce the number of bits for encoding, the lossy compressor employs arithmetic coding for the first two steps and Huffman coding for the last step.

The output of the lossy compressor circuitry over lines 30, as noted above, is passed to the encoder 18. In addition, those signals are employed by the error circuitry 14 for determining what the receiver would have seen, absent any errors in the channel, and thereby providing the mechanism for determining the prediction error signal, that is, the signal representing the difference between what the receiver would have predicted based upon the coded motion signal representation over lines 30, and the true image input.

The output of the lossy compressor over lines 30 is used by a reconstructor circuitry 34 for producing, at its output, a signal representative of the measure of motion displacement, the motion vectors, on lines 32. The difference between the signals over lines 36, the output of the reconstruction circuitry, and the signals over lines 32, represents the coding error introduced by the lossy compression apparatus 28. The output of the reconstruction apparatus 34, over lines 36, is directed to a motion field interpolation circuitry 38 which operates in the spatial domain to associate with each picture element a motion displacement vector. Thus, while the input signals over lines 36 represent motion displacements for groups or regions of elements, for example, the picture elements of a 4×4 block, the motion field interpolator, as described in more detail below, resolves that data so that there is associated with each picture element, a motion displacement vector. The resulting output of the motion field interpolator, over lines 40, is designated the motion reconstruction signal.

The motion reconstruction signal is applied to a motion compensation apparatus 42 which forms part of an error reconstruction loop 43. The error reconstruction loop includes a frame buffer 44, a lossy compression circuitry 46, and a reconstruction circuitry 48. The inputs to the lossy compression circuitry 46, over lines 22 and 51 respectively, are the original input image for the current frame and the estimated receiver signal, that is, the signal which, absent any further data, the receiver will reconstruct and display. The lossy compressor 46 provides the receiver with further encoded data, the error reconstruction signal, for reducing, and in principle eliminating, the difference between the original input image and the estimated receiver signal. That difference is coded to reduce its bandwidth and the resulting signal, the error reconstruction signal over line 52, is delivered to the channel encoder 18. The lossy compressor 46 in the above referenced Ericsson patent is a two-dimensional block encoder which employs a gain/shape vector quantization; and the output of the block transform can be advantageously further reduced in bandwidth and encoded according to the processes described above in connection with the lossy compressor 28. However, in the preferred and illustrated embodiment of the invention a hierarchical entropy encoded, lattice threshold quantization encoding method and apparatus are advantageously employed in implementing the lossy compressor 46.

The error reconstruction signal is also sent to the reconstruction apparatus 48 which provides an operation which is the inverse to that imposed by the lossy compressor 46. There results, therefore, at the output of the reconstruction apparatus 48, an error reconstruction image over lines 54. The error reconstruction image is added to the expected output of the motion compensator, (which is the estimated receiver image over lines 51) and the resulting signal, an estimated previous receiver image (the predicted receiver image for the previous frame), is stored in the frame buffer 44.

As noted above, the input to the frame buffer 44 is the estimated previous receiver image. This receiver image, which takes into account all data received by the receiver, corresponds to the reconstructed receiver image for a frame. The image output from the frame buffer over lines 64 is the image which the motion compensation circuitry 42 modifies in accordance with the output of the motion field interpolator 38 over lines 40. The output of motion compensator 42 thus represents the predicted receiver image as a result of reconstructing the output data from lossy compressor 28.

At the receiver 21, referring to FIG. 3, the data from the channel is decoded by a channel decoder circuitry 70 and the resulting receiver error reconstruction signal over lines 72 and receiver coded motion signal representation over lines 74 are delivered to reconstruction circuitry 76, motion compensator 99, and reconstruction circuitry 78 respectively. The reconstruction circuitries 76 and 78 each provide for decoding the codes employed by the transmitter to effect the operations performed by reconstruction circuitries 48 and 34, respectively, of the transmitter, as described in more detail hereinafter. The output of the error reconstruction circuitry 76 is delivered to a recovery loop 80 in which motion compensating signals over lines 82 are added to the error image representation over lines 84 to produce a reconstructed receiver signal over lines 86. That signal is delivered to a digital-to-analog circuitry 90 and from there to a monitor 92 for viewing.

Motion reconstruction signals are generated by a motion field interpolator 96 corresponding to the motion field interpolator 38 of the FIG. 2. The motion field interpolator, as noted above, provides a motion vector for each picture element of the image and hence allows the frame interpolator to accurately predict what the image would have been at any selected time between received frames. The reconstructed receiver images over lines 86 are successively stored in a frame buffer 98 and are delivered to a motion compensator 99 which also receives signals from the motion field interpolator 96. The output of the motion compensator, representing the expected receiver image in the absence of an error correction, corresponds to the signal over lines 51 in the transmitter, and is delivered to the adder 100 for combination with the output of the error reconstruction circuitry over lines 84.

The transmitter and receiver circuitries of FIGS. 2 and 3 can be modified in a number of ways as described, for example, in U.S. Pat. Nos. 4,727,422 and 4,816,914 referred to above. While these alternate embodiments of transmitter and receiver structure are applicable in different communications configurations, the invention described and claimed herein relating to the entropy coded, lattice threshold quantization encoding system is not dependent upon which of those particular transmitter configurations is employed and will therefore be described solely in connection with the typical transmitter and receiver configuration set forth hereinabove.

The motion field interpolator (38, 96) of the transmitter and receiver circuitries and the lossy compressor 28 of the transmitter circuitry, are described in detail in Ericsson, U.S. Pat. No. 4,849,810, issued Jul. 18, 1989, which is incorporated herein, in its entirety, by reference. The lossy compressor 46, however, which is also described in the Ericsson patent, is modified by its use of the entropy encoded, lattice threshold quantization encoding method. Accordingly, the lossy compressor is described in detail herein. Further, the motion estimator and an adaptive filter which can be advantageously used in accordance with the present invention, are also described in detail in the above identified Ericsson, U.S. Pat. No. 4,849,810.

The Lossy Compressor (46)

As noted above, the lossy compressor 46 receives as inputs the original uncoded signal over line 22 and signals representing the estimated receiver image over lines 51. The lossy compressor 46 uses those signals for encoding the difference between them, and outputs the encoded error reconstruction signal over lines 52. This signal corrects for most errors not properly compensated for by the motion compensation system.

Figure 4:
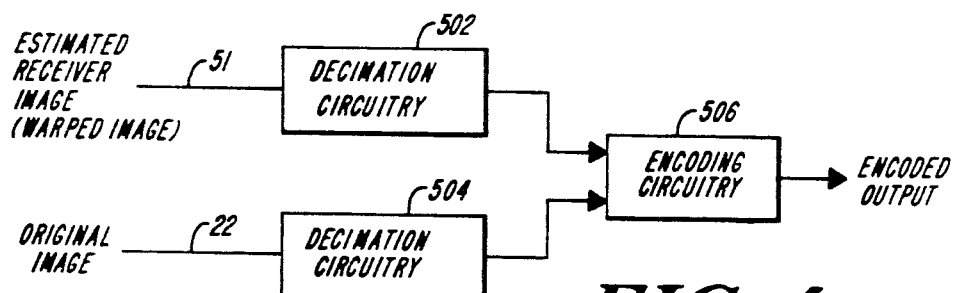
FIG. 4 is a block diagram of the lossy compressor 46 according to the invention.
Figure 5:
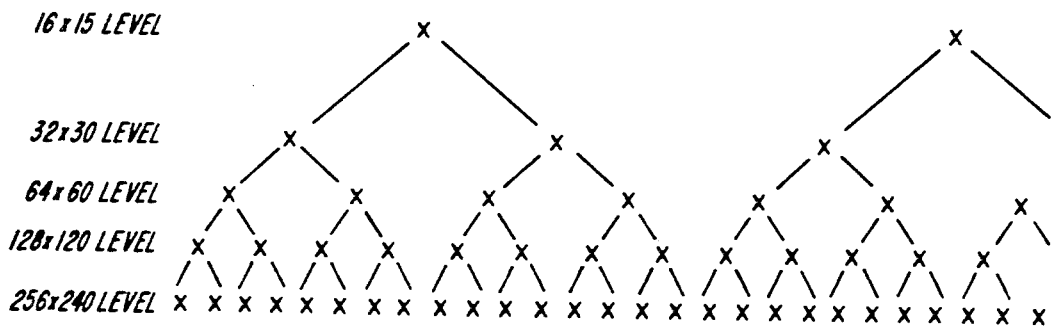
FIG. 5 is a diagrammatic representation of a one dimensional decimation process.

Referring now to FIGS. 4 and 5, the estimated receiver image over line 51 (often referred to as the "warped" image) and the original uncoded image over lines 22 are decimated (that is, filtered and subsampled as described below) by decimation circuitries 502, 504, respectively, four times. At each decimation stage, the image is subsampled by a factor of two both horizontally and vertically. Thus, five levels of images for the luminance image are available at resolutions of, in the illustrated embodiment, $256 \times 240$, $128 \times 120$, $64 \times 60$, $32 \times 30$, and $16 \times 15$ picture elements for the luminance. The set of images, at the different image resolutions, is commonly referred to as a "resolution pyramid." The base of the pyramid is the full resolution image while the top of the pyramid is, in the illustrated embodiment, the $16 \times 15$ pixel image.

Similar resolution pyramids are formed for the "I" and "Q" chrominance components of a color image. However, for the discussion below, only the luminance component of the image shall be discussed. The same apparatus and processing steps are equally applicable to the chrominance components of the image.

In accordance with the lattice threshold quantization system, encoding of the image difference between the warped image and the original uncoded image is performed by an encoding circuitry 506 on a level by level basis, from the top level to the bottom level of the resolution pyramids. The process terminates at that resolution when no additional bits are available for video transmission. Thus, during a moderate motion, the system will typically reach the bottom or base level of $256 \times 240$ pixels while during a heavy motion the encoding may stop at the $128 \times 120$ level. Typically, during a scene change, the apparatus will run out of transmission bits earlier in the pyramid or divide the available lists among the several pyramid levels. Thus, in general, large changes of image or scenes are typically described first at the higher levels with the details being filled in later frames.

Figure 6:
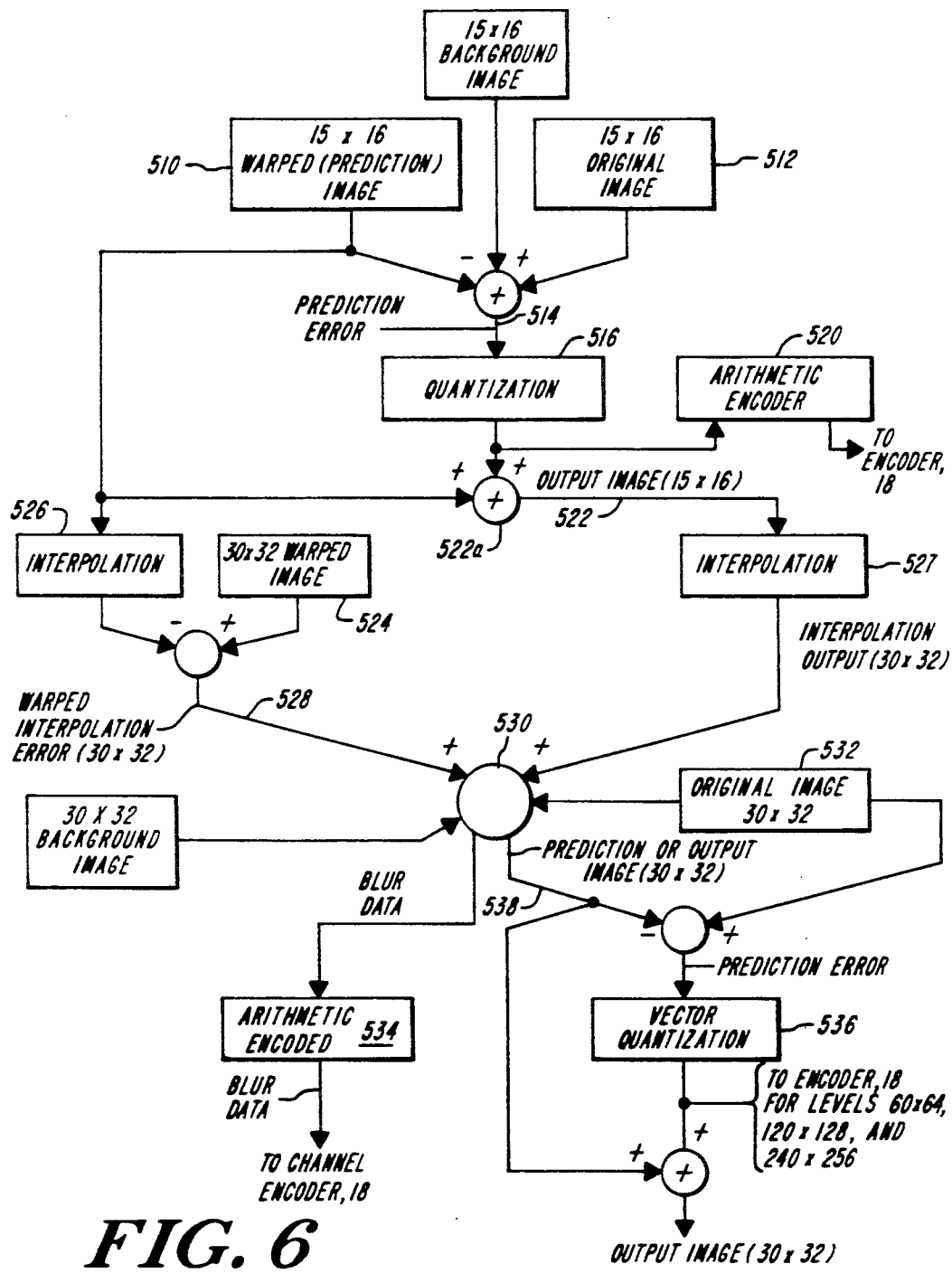
FIG. 6 is a detailed electrical block diagram of lossy compressor 46 according to the invention.

More particularly, in accordance with a preferred hierarchical coding system using entropy coded, lattice threshold quantization (EC-LTQ), encoding begins at the top level, that is, the $16 \times 15$ image. The $16 \times 15$ version of the warped image or a background image (as described in detail in copending application, U.S. Ser. No. 07/521,976, for "A Hierarchical Encoding Method and Apparatus Employing Background References for Efficiently Communicating Image Sequences" the disclosure of which is incorporated herein, in its entirety, by reference) is used as the prediction. Recall that this corresponds to the image (decimated) that is created at the receiver absent any additional information. Referring to FIG. 6, this top level prediction is subtracted from the $16 \times 15$ decimated top level image of the original image. The difference image, representing the error at that top level, is quantized and the quantized information is directed to the encoder 18 for transmission to the receiver. Thereafter, the quantized difference image is added to the prediction image, at the $16 \times 15$ level, to form a $16 \times 15$ reconstructed image which the receiver will also create.

At the lower levels, the prediction version of the image is formed in a different fashion. In accordance with the invention, the prediction is derived from the higher level reconstructed image and from the current level warped image as follows.

First, an interpolation error image is derived by interpolating the higher level warped image and subtracting it from the current level warped image. The resulting warped interpolation error image thus essentially extracts the spatially higher frequencies of the warped image, that is, information not present in the higher level image. The higher level reconstructed image is then interpolated to form an interpolated, reconstruction image at the current level. Finally, the warped interpolation error image or the background image is selectively added to the interpolated reconstruction image to generate the prediction image. As described in detail in the copending application 07/521,976, the warped interpolation error image or the background image is used where it improves the prediction but not otherwise. This is decided on a block-by-block basis, and the decisions are transmitted to the receiver as "side" information.

Thereafter, the steps for generating the difference signal at this lower level are the same as those at the top level, that is, the current level prediction image is subtracted from the current level original image and that difference is quantized and transmitted to the receiver. Thereafter the quantized difference is added to the prediction image at that level to form a new reconstruction image. This procedure is repeated through the resolution pyramid until the bottom level is reached. The reconstructed image at the bottom level is the output image at the level, and it is that image that is displayed by the decoder. That image is also used as described above to form a warped image for the next frame. The warped image reconstruction at the transmitter is, as noted above, performed by the reconstruction circuity 48.

If all of the available bits have been used before the bottom level is reached, the predictions at the lower levels are still generated in the same manner; however, no coding, that is, no quantized difference information is sent to the receiver. Instead, the prediction at the lowest levels will be used directly as the output or reconstruction image at that level and as the error reconstruction image over lines 54 from reconstructor circuitry 48.

Details of the Hierarchical Entropy Coded, Lattice Threshold Quantization Encoding System Referring to FIG. 5, the resolution pyramid is formed, as noted above, by decimating four times, in this illustrated embodiment, the highest resolution level of the image. In the one dimensional relationship illustrated in FIG. 5, each pair of pixels at a lower level are averaged to form a single pixel at an upper level. The situation is the same both horizontally and vertically so that each higher level picture element is located at the center of a $2 \times 2$ pixel group of the lower level. The coding method also provides for generating, using an interpolation procedure, the pixels at a lower level from a higher level. The interpolation process is applied, for example, to the warped and reconstructed images to obtain images for processing at the next lower level and is effected by a bilinear interpolation. The interpolation factors are 0.75 and 0.25.

In the illustrated embodiment of the invention, arithmetic coding is employed for both coding of information for transmission from the lossy compressor 28 as well as, and as will be discussed in more detail below, the coding of scalar data from lossy compressor 46. Arithmetic coding is well known to those skilled in the art. In particular, it can be applied advantageously to describing the locations of non-zero transform or other array variables. The symbol probabilities are changed depending upon previously transmitted values and the sequence position of the coefficient. Prestored probabilities are employed since on-line adaptation does not, in the experience of the inventor, provide significant improvement in this application.

Considering the encoding of the resolution pyramids in more detail, and referring to FIG. 6, the original and warped images have, at the top level, a resolution of 15×16 pixels for the luminance and 8×8 pixels for the chrominance, respectively. FIG. 6 describes the processing of the luminance component; and the processing of the chrominance component (not shown) can be similarly illustrated. The prediction image consists of the top level warped image that was obtained originally by four decimations of the warped luminance and chrominance images, respectively. The prediction error is generated by subtracting the prediction image 510 from the original, uncoded, top level decimated image 512. The image differences over line 514 are quantized by a scalar quantizer 516 having a fixed step size. The quantized information over line 518 is encoded separately for each component, the Y, the I, and the Q components, using the same arithmetic encoder 520 which is also employed for the motion vector transform coefficients. Encoder 520 uses a Markov Model for encoding the non-zero data locations. The encoder has sixteen states depending upon whether the already encoded four nearest neighbors corresponding to the four nearest neighbors illustrated in FIG. 8 are zero or non-zero. The non-zero values are encoded by a memory-less coder that encodes the eight bit quantization indices into the bit stream. The quantized difference image is added to the prediction as noted above, and the result is the output or reconstruction image (over lines 522) at the top level.

The scalar quantizer 516 used in connection with the top level prediction error is a uniform quantizer having a dead-zone around zero. It codes the sign with a 1 bit and the magnitude with 7 bits in the illustrated embodiment. The thresholds (T(i)) for the magnitude are located at:

$$T(i) = i*T \quad \text{(Equation 1)}$$
$$i = 1, 2, \ldots, N$$

The reconstruction levels (R(i)) are defined by:

$$R(0) = 0 \quad \text{(Equation 2)}$$
$$R(i) = (i + \text{Delta}*R) \, i = 1, 2, \ldots, N$$

Therefore, a value of X, where X is greater than T(k) but less than T(k+1) is assigned a quantizer index value of k and is reconstructed at the receiver as having a value R(k). The quantizer is also symmetric around zero and sets all values with a magnitude less than T(l) equal to zero.

For the lower levels of the resolution pyramid, the prediction image is generated by combining the output image from the next higher level with the warped image of the same level. Then, the prediction error is formed by taking the difference of the original image at the current level. The difference image is coded using a lattice threshold quantizer and the quantized difference is added to the prediction to obtain a new output image at the current level. The Y, I, and Q components are treated as three separate images.

Considering the lower levels in more detail, the prediction image is generated by combining the warped image at the current level with the output and warped images from the next higher level. Specifically, the interpolation error of the warped image is generated using the warped image 524 at the current level and an interpolated version of the warped image from the next higher level (interpolated by circuitry 526). That interpolation error is thus the difference between the current level warped image and the same image that has been decimated and interpolated. As noted above, it contains the details of the warped image that were lost in the decimation to form the next higher level image. The output image from the next higher level is then interpolated at interpolation circuitry 527 to obtain an image at the current level. Thereafter, the warped interpolation error over line 528 or the background image is conditionally added by adder 530 to the interpolated output image to form the prediction. That is, for each block of 8×8 pixels, the squared error is determined between the original image stored at 532 and three possible predictions, that is, between the interpolated output image from the next higher level with and without the inclusion of the warped interpolation error, and also that with the inclusion of the background image.

The elimination of the warped interpolation error is equivalent to low pass filtering the warped image for the prediction. This effective filtering process is performed in all blocks where it provides a significant decrease in the prediction error, that is, in those blocks wherein motion compensation was not successful. The result of the filtering process, termed "blurring," is effected if the "blurred error," multiplied by a weighting factor, such as 1.5 in the illustrated embodiment, is less than the error using the warped interpolation error. The use of the background image is equivalent to a long term memory such that a representative of the non-moving object can be retained by the decoder even when these objects are briefly occluded. This background frame should only be used when a significant gain is achieved over other choices. Therefore, its weighting factor is 20%-25% greater than the "blurring" weight.

The blur and background information generate a one or two bit (3 states) word for each 8×8 block. This is similar to the method used in motion vector field coding, and these two bits "answer" the following two questions:

a) Does the system blur the current (8×8) block?

b) If blurring is not preformed, should warped prediction or the background image be used?

For example, a one indicates blurring and a zero indicates no blurring. The information is encoded using an arithmetic coder 534 such as that noted earlier, and since each word contains only one bit, there is no need to encode the non-zero values once the "blur location map" has been encoded.

The particular arithmetic encoder 534 for the blur information uses six binary variables to select one of thirty-two states with corresponding probabilities. The binary variables are the four previously encoded blur words for neighboring blocks at the same level and the blur word for the higher level neighbor, that is, the block at the next higher level that corresponds to the current block. Thus, the encoder does not make explicit use of the fact that blurring at one level propagates to lower levels and instead this relationship is reflected in the probabilities for the various states having a non-zero higher level neighbor.

The prediction errors themselves are coded by the lattice quantizer 536. Thus, at each level, the Y, I, and 0 components are treated as three separate images. Each different image, generated for each level, is thus divided into blocks of $4 \times 2$ pixels. Each block then becomes the "vector" and is coded by the lattice quantization by first determining a closest point and thereafter indexing the point as described in greater detail below.

The remaining levels can be encoded using the procedures applied at the $(30 \times 32)$ level, and using equivalents of elements 524, 526, 527, an adder 538, and elements 530, 534, and 536, but with the exception that the image data will be encoded, in the preferred embodiment, as described below.

The entropy coded, lattice threshold quantization described herein replaces the vector quantization described in Ericsson, U.S. Pat. No. 4,849,810. In comparing vector quantization (VQ) encoding with entropy coded, lattice threshold quantization encoding, we know, from Shannon Theory, that as the size and dimension of an optimally designed VQ codebook increases, its performance approaches the operational distortion-rate bound, without the need for entropy coding. Complexity in the VQ process, however, also grows without bound, and clever methods must be used to obtain good performance with only moderate complexity. Lattice quantizers that are optimum in the Shannon sense were, prior to the invention herein, known for only a handful of sources and dimensions. For example, the hexagonal lattice is optimum for an independent, identically distributed uniform source in two dimensions. It has also been shown that a rectangular lattice works well for independent, identically distributed Laplacian sources. In general, one can show that lattices having high sphere packing densities work well for independent, identically distributed sources, provided the coding rate is high and an efficient entropy code is used for transmitting the indicies. Achieving good performance at low rates and for sources with memory, such as that described in this application, has been an elusive goal.

Entropy Coded Lattice Threshold Quantization

In accordance with the invention, an optimum performance over a wide range of data rates for a variety of data sources can be obtained for the first time using multiple dimension lattices. The preferred encoding structure is termed the Entropy Coded Lattice Threshold Quantizer (EC-LTQ) illustrated in FIG. 10. The preferred embodiment of the invention uses an eight-dimensional lattice having the highest known sphere packing density, the E-8 lattice.

Figure 9:
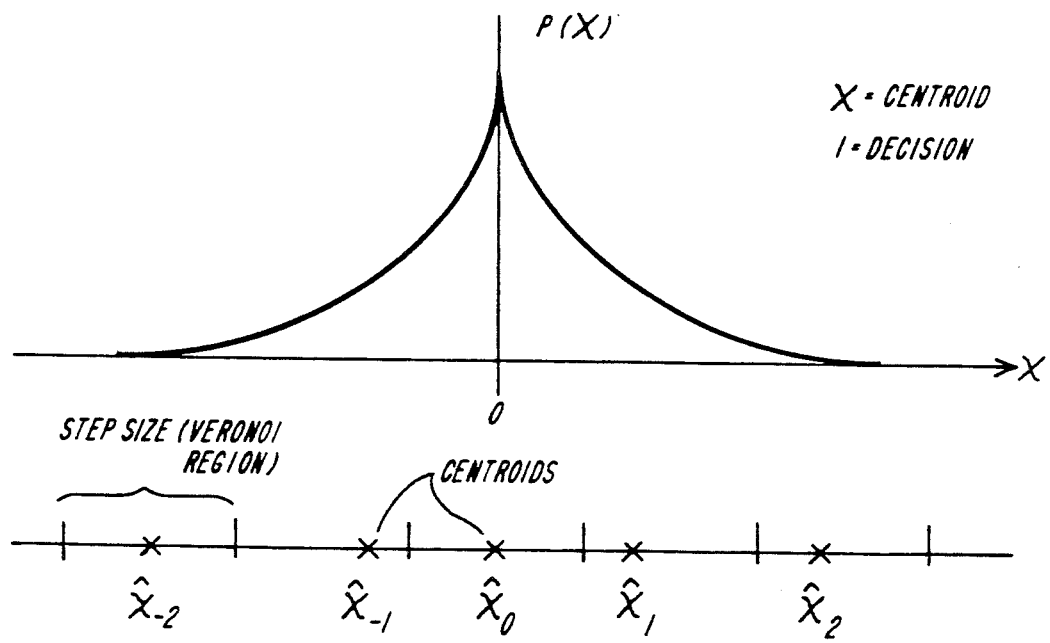
FIG. 9 is a probability density function divided into stepped regions and showing centroid locations.
Figure 10:
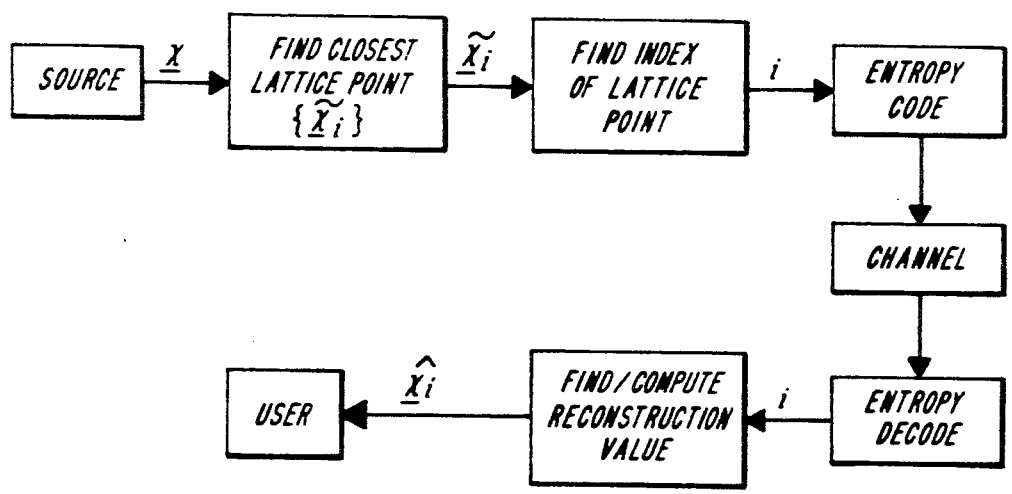
FIG. 10 is an electrical block diagram of a coding apparatus according to the invention.

The vector quantizer referred to in Ericsson, U.S. Pat. No. 4,849,810 is designed for a given (though possibly unmeasured) source probability density function (pdf) by successively optimizing during a training period, its encoder for its decoder, and its decoder for its encoder, etc., resulting in a locally (though not globally) optimal design that typically does not require further coding, such as entropy coding. On the other hand, most lattice quantizers work best only for memoryless probability density functions. However, it has been shown that the simplest one-dimensional lattice (the Z-1, or uniform quantizer) can not only approach, but can even attain the scalar quantizer's Gish-Pierce performance bound. The excellent performance is obtained by using the centroid of each Voronoi region for the quantizer's reconstruction value, (FIG. 9) and by coupling the uniform threshold quantizer with an efficient entropy code (FIG. 10). The particular distortion-rate operating point is fixed by the quantizer's step size.

The Entropy Coded Lattice Threshold Quantizer of the present invention generalizes the uniform threshold quantizer to the vector case. According to the invention, as noted above, the E-8 lattice is used to encode the source, and a separate, optimal decoder is designed for it. The encoder output is coded using a near-optimum entropy code. The decoder consists of a countable set of centroids, one centroid for each lattice point's Voronoi region, given the source probability density function and distortion measure.

The lattice threshold quantizer's performance lies between the scalar quantizer's Gish-Pierce bound and Shannon's Operational Distortion-Rate Bound. While an entropy coded, lattice threshold quantizer can be built for any lattice, entropy coded lattice threshold quantization performance is relatively independent of the particular lattice employed, so even the simplest n-dimensional lattice, the n-dimensional cubic (or Z-n) lattice, can work about as well as the more complex, but denser, E-8 or 24-dimensional Leech lattices.

There are several reasons for preferring entropy coded lattice threshold quantization over vector quantization, even if entropy coded lattice threshold quantization could not attain the vector quantization's distortion-rate performance. First, since a conventional vector quantization codebook is finite, there exists a hypersphere which contains all codevectors in it. Source vectors lying outside the hypersphere will typically have low probability and thus add little to the vector quantization's average distortion, but they nevertheless incur substantial instantaneous distortion, appearing at the decoder's output as infrequent, but easily perceived and annoying artifacts. For example, in image coding, vector quantization overload can result in an easily perceived localized blur or granularity; and in speech coding, it can cause a momentary but audible distortion. Lattice quantizers have no overload region, since even a source vector having arbitrarily large energy will still be located near a point in the lattice. A lattice quantizer can thus improve perceived performance of source coding systems, especially those needing occasional instantaneous high rates.

Second, fast encoding methods for lattices exist and others are continually being sought, especially for lattices having high sphere packing densities (e.g., the E-8 and the 24-dimensional Leech lattice). These methods perform optimum encoding by locating the unique point in the lattice that is closest to a given source vector. In contrast, most fast encoding methods for vector quantization either perform a sub-optimum search of the vector quantization's finite codebook or, to attain optimum encoding, typically require substantially more memory than is needed to store the codebook itself.

Third, assuming one has a good predictor that excises much of the memory from the source, transforming the quantizer's source model into a peaked (though not necessarily i.i.d.) probability density function, excellent distortion-rate performance can be obtained from the entropy coded lattice threshold quantizer by expending memory and complexity only to optimally encode the most probable source vectors, leaving simpler sub-optimal encoding techniques for the less frequent outliers. This is important for practical implementations of entropy coded lattice threshold quantization, such the real time video compression described here. The preferred embodiment of the invention shows one novel way to accomplish this for the E-8 lattice.

While in the preferred embodiment of the invention, entropy coded lattice threshold quantization is applied to a closed-loop pyramid image compression method, the entropy coded lattice threshold quantization techniques herein described are equally applicable to open-loop pyramid image compression, conventional sub-band and transform image and speech coding, and virtually any other compression technique using vector quantization.

Entropy Coded Lattice Threshold Quantization For The E-8 Lattice

The preferred embodiment of entropy coded lattice threshold quantization for hierarchical compression in accordance with the invention, uses the E-8 lattice and the apparatus and method of the invention provide methods to efficiently implement entropy coded lattice threshold quantization for this lattice.

The E-8 lattice is composed of the union of one D-8 lattice with a second D-8 lattice translated by the vector 0.5 * (1 1 1 1 1 1 1 1). The D-8 lattice is composed of all 8-dimensional vectors having integer components which sum to an even number. For example, (1 −3 0 0 0 0 0 0) is a point in D-8 lattice, while (1 1 1 0 0 0 0 0) is not. Since the translating vector also sums to an even number, the components of all points in E-8 lattice sum to an even number. Note also that the E-8 lattice includes the all zero vector.

All points in the E-8 lattice can be grouped by the value of their L-2 norms (sum of squares) into shells, where the shell number increases with the L-2 norm. The all zero vector is the only lattice point having zero norm and it comprises Shell 0. There are 240 points having an L-2 norm of 2.0, and these points comprise Shell 1. There are 2160 points in Shell 2, each having an L-2 norm of 4.0, and so on. For typical pyramid video coding applications, such as that described herein, the probability density function is very "peaky" so that over 90% of the source vectors fall onto Shell 0. Of the remaining 10%, roughly 80% to 90% or more fall into Shells 1 and 2, making it worthwhile to code Shells 1 and 2 efficiently, but permitting simpler methods to be used for Shells 3 and up.

The entropy coded lattice threshold quantization process is performed in five steps: quantizing the source vector to the nearest lattice point, encoding the lattice point to a unique lattice index, entropy coding the index, decoding the index, and reconstructing the vector using a scaled version of the centroid associated with the lattice point. In accordance with the preferred embodiment, the method implementation performs each step for the E-8 lattice.

Quantizing to the Nearest E-8 Lattice Point

The quantizer can identify the closest E-8 lattice point using one of several algorithms. In the preferred embodiment, the quantizer first rounds the source vector to its nearest integer coordinates and then sums the coordinates to check whether the point is on the D-8 lattice. If the sum is even, this point is on the integer (not translated) D-8 lattice. If the sum is odd, then the closest lattice point (in the L-2 sense) is found by rounding the component having the largest roundoff error to the next nearest integer. Next, the quantizer finds a closest lattice point on the translated D-8 lattice. Each component of the source vector is truncated and increased by 0.5 and the resulting vector's components are summed. If the sum is even, this point is on the E-8's offset or translated D-8 lattice. If the sum is odd, then the closest lattice point (in the L-2 sense) is found by rounding the component having the largest error to the next nearest integer-plus-one-half.

Both of these D-8 lattice points will lie on the E-8 lattice. To identify the one closest to the source vector, we can compute the L-2 distance from each. However, a numerically simpler method is to note the following. For the present, assume that rounding and truncating both result in points on the lattice and let Rn and Tn be the errors introduced by rounding (untranslated D-8 lattice) or by truncating and adding one-half (translated D-8 lattice) to the nth coordinate, $n=1, 2, \ldots, 8$. Then the difference between the squares of the distances to each candidate lattice point is:

$$\text{sum\_over\_}n[Rn * Rn] - \text{sum\_over\_}n[Tn * Tn] =$$

$$\text{sum\_over\_}n[Rn * Rn - Tn * Tn] =$$

$$\text{sum\_over\_}n[(Rn - Tn)(Rn + Tn)]$$

Note that when $Rn \leq 0$, then $(Rn-Tn)=0.5$ and $Tn=0.5-Rn$. Also, when $Rn<0$, then $(Rn-Tn)=-0.5$ and $Tn=0.5+Rn$. Substituting, we find this reduces to $$= \text{sum\_over\_}n[|Rn| - 0.25]$$
$$= \text{sum\_over\_}n|Rn| - 2$$

In an implementation, the subtraction can also be obviated by comparing the sum to two.

In accordance with the invention, a simple technique enables quick determination of the oddness or evenness of the sum of the coordinates. Since there are an even number of coordinates, subtracting ¼ from each does not affect the oddness or evenness of their sum. So for the truncate and add one-half case, adding the "half" can be omitted. Also, if the rounding error Rn is non-negative ($>=0$), the same value is obtained whether a coordinate is rounded or truncated. If Rn is negative, then the truncated value is one less than the rounded value. Combining these facts, the oddness or evenness of the sum of rounded and truncated coordinates is the same if and only if R1 R2 ... R8 $>=0$, where ( ) designates the exclusive-or operation. If the exclusive-or operation returns a negative value, the evenness/oddness of the rounded coordinates will be the opposite of that of the truncated coordinates. The oddness or evenness of both round and truncate plus one-half cases can thus be checked by computing only the sum of the truncated values and R1 R2 ... R8.

Finally, the largest magnitude error obtained by truncating and adding one-half occurs for the coordinate having the smallest magnitude error obtained by rounding. The sign of the error indicates whether "one" must be added or subtracted to move to the coordinate of the closest lattice point. If a coordinate is changed, its corresponding error term (Rn or Tn) must also be updated as follows: If a rounded off coordinate changed, $$Rn(new) = 2 * [Rn(old)] - 1,$$

while if a truncate-and-add-one-half coordinate changed, its corresponding influence on Rn is $$Rn(new) = 2 * [Rn(old)].$$

Encoding Indices and Minimizing Centroid Storage

Having found the E-8 lattice point closest to the source vector, the point must be unambiguously identified to the receiver. We do so in pairs of 8-dimensional blocks, where each pair forms a 4×4 block of pixels. We first generate a sequence of bits, one bit for each 4×4 block, where the bit is zero if both lattice points corresponding to the block belong to Shell 0, and the bit is one if one or both lattice points belong to a shell other than Shell 0. Isolated ones at highest resolution level, that is, the 256×240 level, in this sequence are set to zero to limit "popping" effects. Arithmetic coding is used for coding this information.

For every remaining "one" in the sequence, we jointly Huffman code the shell numbers for both lattice points in the corresponding block. Since most source vectors code to shells 1 or 2, we consider only four cases: Shell 0, Shell 1, Shell 2, and Shell 3 or higher. Since we already know that at least one lattice point is outside Shell 0, there are 15 possibilities, so we use a table of 15 Huffman codes.

We next describe how the receiver finds the particular point on the indicated shell. Since there is only one point in Shell 0, no lattice index need be sent. If the point is on Shell 1 or Shell 2, the procedure described below is used to identify the particular point to the receiver, exploiting symmetries to reduce the storage needed for the associated centroid and probability distribution. Only 920 centroids are needed for the 2400 points in Shells 1 and 2. The remainder are permutations. Also, lattice points having permutations of the same centroid conveniently have the same source probability, so only 920 Huffman codes (the preferred entropy encoding method) are stored, one centroid and one Huffman code per "parent" centroid. Since the receiver will know each lattice point's shell number, the preferred implementation actually uses two sets of Huffman code tables, one table containing 120 codes for Shell 1, the other 800 codes for Shell 2. (One table from each set is selected by computing the ratio of the source vector's energy to the step size being used. This enables us to adaptively code the lattice points.) Finally, if the point is on Shell 3 or higher, we explicitly transmit the point's coordinates, usually by jointly Huffman encoding pairs of data.

In accordance with the illustrated embodiment, the lattice point's energy can be computed and its shell identified. Each eight dimensional lattice point corresponds to a two column by four row block of pixels. For points on Shell 3 or higher, there is sufficient correlation between the columns to justify jointly coding coordinate pairs. Denoting the spatial relationships of the lattice points as:

x0 x4
x1 x5
x2 x6
x3 x7 point pairs (x0, x4), (x1, x5), (x2, x6) and (x3, x7) are jointly coded. (If the pairs exceed some pre-determined dynamic range, they are individually coded. Also, it is necessary to hard-limit the coordinate's range to limit the size of the required Huffman tables.) At the receiver, the lattice point is reconstructed by taking the product of the lattice coordinate, step size and an attenuation factor, discussed later.

Shells 1 and 2 are coded using Huffman codes based upon computed probabilities. A straightforward implementation would store 2400 8-dimensional centroids and 2400 Huffman codes for the 2400 points in the two shells. However, considerable storage can be saved by noting symmetries between the points. In particular, we note that half the points are the negatives of the other half. We denote such pairs as having opposite polarity (that is, they exhibit polarity symmetry). Of those that remain, many are permutations of one another, formed either by switching the columns, rows or both columns and rows as follows:

| x0 x4 | | x4 x0 | | x3 x7 | | x7 x3 |
|---|---|---|---|---|---|---|
| x1 x5 | or | x5 x1 | or | x2 x6 | or | x6 x2 |
| x2 x6 | | x6 x2 | | x1 x5 | | x5 x1 |
| x3 x7 | | x7 x3 | | x0 x4 | | x4 x0 |
| (original) | | (column flip) | | (row flip) | | (both flip) |

This is the same symmetry used to reduce codebook size in the Mean-Reflected Residual Vector Quantizer proposed by Baker and Budge.

We identify these symmetries by first computing the lattice point's 8-bit group number (GN), a number found by multiplying the lattice point by E-8's inverse generator matrix and taking modulo 2 of each component. The matrix is:

$$\begin{vmatrix} 0.5 & -0.5 & -0.5 & -0.5 & -0.5 & -0.5 & -0.5 & 2.5 \\ 0 & 1 & 0 & 0 & 0 & 0 & 0 & -1.0 \\ 0 & 0 & 1 & 0 & 0 & 0 & 0 & -1.0 \\ 0 & 0 & 0 & 1 & 0 & 0 & 0 & -1.0 \\ 0 & 0 & 0 & 0 & 1 & 0 & 0 & -1.0 \\ 0 & 0 & 0 & 0 & 0 & 1 & 0 & -1.0 \\ 0 & 0 & 0 & 0 & 0 & 0 & 1 & -1.0 \\ 0 & 0 & 0 & 0 & 0 & 0 & 0 & 2.0 \end{vmatrix}$$

Of the 256 possible group numbers (GN's), one group number (having value zero) corresponds to the all zero Shell 0 lattice point, 120 each correspond to two of Shell 1's 240 lattice points, and the remaining 135 correspond to Shell 2's 2160 points. It is clear that a lattice point and its negative yield the same group number. Thus each of the 120 group numbers for Shell 1 corresponds to one lattice point and its negative. Closer inspection reveals that each of the 135 group numbers for Shell 2 corresponds to exactly 16 lattice points, eight of which are negatives of the other eight. Each group of eight are also mutually orthogonal, and therefore, the following method can be used for indexing them. Form an 8×8 matrix using each point a(i)T, i=0, 1, ..., 7, as a row in the matrix, where T denotes transpose and the vector a(i) the ith eight dimensional lattice point. Since the points are orthogonal and have the same norm, multiplying any one of them by the matrix yields a vector having only one non-zero component with value equal to the squared norm. The following quadratic form yields the index between 0 and 7:

$$c * [1\ 2\ 3\ 4\ 5\ 6\ 7\ 8] \begin{vmatrix} |a(0)T| \\ |a(1)T| \\ |a(2)T| \\ |a(3)T| \\ |a(4)T| \\ |a(5)T| \\ |a(6)T| \\ |a(7)T| \end{vmatrix} a(i)$$

where c is the reciprocal of the squared norm for any point a(i). This computation can be simplified by premultiplying c, the [1 2 3 4 5 6 7 8] row vector and the 8×8 matrix, yielding a single 8-dimensional row vector. The result of the inner product is a unique index between −8 and 8 excluding 0. Thus only 135 row vectors need be stored for the lattice points of Shell 2.

Of the 135 GNs in Shell 2, lattice points in 65 of them share only polarity symmetry, while in those in the other 70 GNs are actually composed of only four points which share exactly one type of flip symmetry in addition to polarity symmetry with the other four (either row or column or row/column flips). Knowing the group number, the receiver will know which (if any) of these symmetries exist. Finally, since lattice pairs having opposite polarity and pairs related by one type of symmetry have the same probability, we need only store one centroid and one probability for each polarity and symmetry. We need 120 for Shell 1 and (65*8+70*4)=800 for Shell 2, for a total of 920 centroids and probabilities.

Entropy Coding and Decoding the Index

We transmit each lattice point in Shells 1 and 2 by entropy coding (using Huffman coding as is well known in the art) its group number and sending one bit (having an entropy of one) for the point's polarity. If the point belongs to Shell 2 (known immediately to the receiver from the group number), three more bits identify which of the eight points (of that polarity) it is. These three bits can be computed at the transmitter from the inner product operation described above. If the point has flip symmetry, one of these three bits will have full entropy. The decoder knows from the GN how many additional bits are needed, so the code is comma free, that is, the decoder can parse the bit stream without further information, and the code is efficient.

Reconstructing the Vector

At the receiver, the vector is reconstructed by taking the product of the lattice coordinate or associated centroid, the step size and an attenuation factor.

Attenuation Factor

Figure 11:
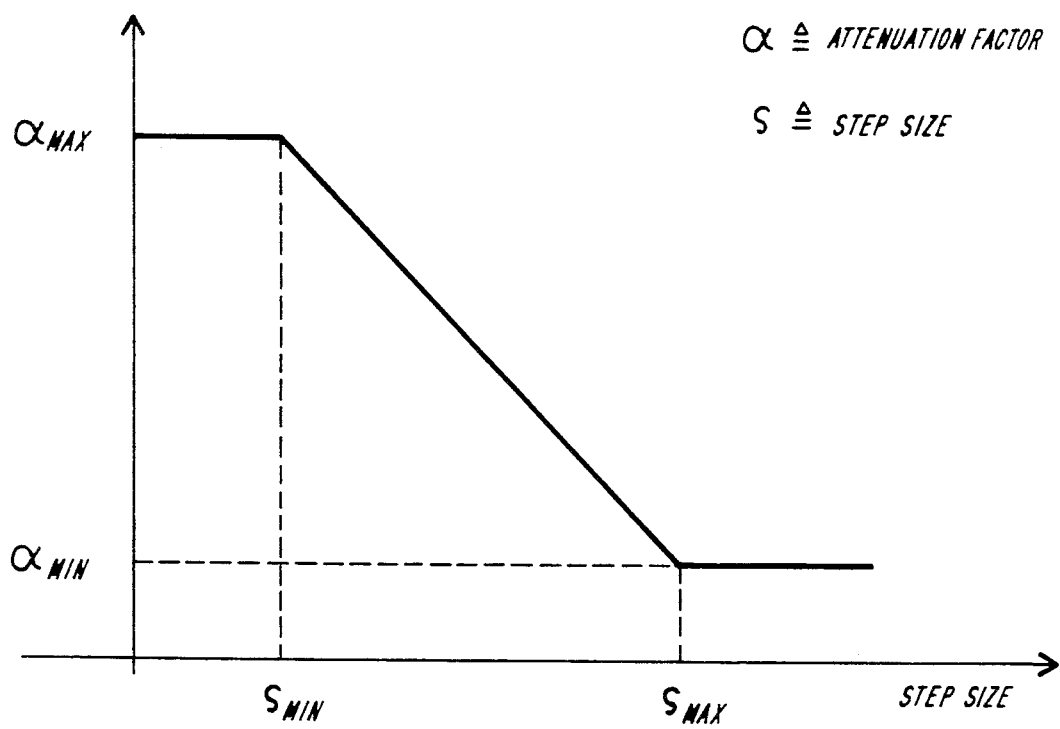
FIG. 11 is a graph illustrating the relationship between the attenuation factor and quantization step size.

The entropy coded lattice threshold quantization is required to operate over a variety of source distributions and bit rates. In this application, entropy coded lattice threshold quantization is used for hierarchical pyramid video coding and the centroids in Shells 1 or 2 are used only at the three highest resolution levels of the pyramid. Yet the statistics of the source at each level differ. Also, at any one level, source probability density functions tend to change in variance as the step size changes. For example, if the input energy is large relative to the step size, the probability distribution over the lattice points is much broader than when the ratio is small. To combat these variations, several classes are defined and are determined by thresholding the ratio of the level's input energy to the square of the level's step size. In the preferred implementation, the apparatus stores a set of entropy code tables for each class. Also, the attenuation applied to the reconstruction value of a vector varies with the class, the level of the pyramid at which encoding is taking place, and the quantizer's shell. The reconstruction is thus given by:

(reconstruction) = (centroid) * (step size)
  * attenuation_factor(step size)
  * attenuation_table(shell, level, class), where the attenuation factor varies with step size, as shown in FIG. 11. An additional attenuation, denoted by attenuation_table, takes a value according to the particular shell the lattice point belongs to, the level in the pyramid being coded, and the class currently in force. For lattice points in Shell 3 and up, the centroid used in this formula is the lattice point itself. These attenuation values are adjusted to limit "popping" artifacts in the reconstructed signal. In general, the cumulative attenuation is not great enough to move the reconstruction value outside the lattice point's Voronoi region. The particular functional values established by the relationships defined here must be determined by teaming regression analyses with some heuristic constraints and perceptual experiments. They are implemented here as tables and piecewise linear functions, but could be generalized to continuous functional relationships.

WHITENING RULE

Since only one set of centroids is used with entropy coded lattice threshold quantization, the source data must be normalized by the step size to collapse its probability density function to a more stationary set of values. In accordance with the illustrated embodiment, the method employed to estimate proper step size, the "Whitening Rule," is a bit allocation method. This method can also be used for the closed loop 5-level Hierarchical Pyramid vector quantization described in earlier patent Ericsson, U.S. Pat. No. 4,849,810. The method determines the number of bits to expend at each of the three higher resolution levels of the pyramid by specifying the step size used for that level. One level (3) is not coded and the last level (0) needs its own estimate, as described in the next subsection.

Since the motion compensated image being coded generally has an energy spectrum which decreases with increasing spatial frequency, and since the levels are coded in the order of increasing spatial frequency, step sizes are selected such that the current level is coded with enough "bits" to match the prediction error energy of the next level. The hierarchical coding structure is closed loop, so that all error energy remaining at the current level carries forward to the next level. The next level then attempts to code what is left to the level of prediction error in the succeeding level, etc.

In more detail, the encoder builds a resolution pyramid of the current frame and creates predictions within the pyramid using motion compensation and background references. In the preferred implementation, there are the five levels previously noted:

| Level | Resolution |
| --- | --- |
| 0 | 256 × 240 |
| 1 | 128 × 120 |
| 2 | 64 × 60 |
| 3 | 32 × 30 |
| 4 | 16 × 15 |

Level 3 is never coded, since we can save some bits without any perceived loss in quality. We scalar code level 4, then code levels 2, 1 and 0. During the process of building the resolution pyramid, the average error energy E(n) at level n={0, 1, 3} is estimated assuming level n+1 were already coded. Then the step size S(n+1) to be used at level n+1 is $$S(n+1) = \min\{a(n) * \operatorname{sqrt}[E(n)+b(n)]; c(n)\}.$$

The Whitening Rule uses three tables, one each for a(n), b(n), and c(n), where n=0, 1, 3, to compute the step sizes for levels 1, 2 and 4. Note that level 3 is not coded and that the step size at level 0 must be selected such that the entropy coded lattice threshold quantizer accurately expends whatever bits remain for the frame.

A method for computing the step size for level 0 can be estimated, in accordance with the invention, at level 0 in two steps. First an open loop estimate is made, followed by a closed loop estimate.

1. Open loop estimate: The estimated level zero step size $S_o(O)$ is computed from the energy in each level and the number of bits available:

$$S_o(O) = \operatorname{sqrt}(\text{energy}) * \exp\{a * \text{bits}^{**}3 + b * \text{bits}^{**}2 + c * \text{bits}^{**}3 + d\}$$

2. Closed loop estimate: The open loop estimate $S_o(O)$ is then modified by a multiplicative parameter c' determined by a recursive formula:

$$S_c(O)(n) = c'(n) * S_o(O)(n)$$

$$C'(n) = c'(n-1) * \exp\{h * \text{diff\_bits}(n-1)\},$$

where n is the frame index, diff_bits(n−1) is the number of bits available less the number of bits used in frame (n−1), and h is a constant. In the preferred implementation, the diff bits process is low pass filtered.

Five constants must be determined by experimentation, a, b, c, d, and h. Two of the equations can be combined into one to reduce the number of exponentiations:

$$S_c(O)(n) = c'(n-1) * \operatorname{sqrt}(\text{energy}(n)) * \exp\{a * \text{bits}(n)^{**}3 + b * \text{bits}(n)^{**}2 + c * \text{bits}(n) + d + h * \text{diff\_bits}(n-1)\}$$

In summary, in accordance with the preferred embodiment of the invention, at the top level, the system uses scalar quantization. At the next level, the 32×30 level for the Y component and the 15×16 level for the chrominance components, the warped interpolation error is selectively added to the interpolated output images from the top level and therefore, at this level, blur information is transmitted. However, in the preferred embodiment of the invention, no encoding of the image information, that is, of the output image error, is performed in the illustrated embodiment. The prediction images themselves are the outputs from this level. In the three bottom levels, all of which are treated identically, adaptive blurring is used when generating the prediction images, and the prediction error is encoded using lattice threshold quantization. This is indicated diagrammatically in FIG. 6.

In the illustrated embodiment, there can occur some circumstances, for example a scene change, when it may not be possible to encode even the next to lowest level. In that instance, the coding will stop at the next level up (60×64 for luminance and 30×32 for chrominance). If the coding at this level generates more bits than the desired number of bits per frame, the coding is still performed and the frame rate will temporarily slow due to the large number of bits being generated. For the two bottom levels, the prediction is generated as usual and the blur information is transmitted; however, lattice threshold quantization is not performed.

Referring to FIG. 3, at the receiver, the transmitted and coded data is decoded and the new frame generated. In particular, the data representing the resolution pyramids is decoded by reconstruction circuitry 76 level by level from the top of the pyramid down to the bottom. At the top level, the quantized difference image is decoded and added to the warped image at that level (in selective adder 100, which includes decimation circuitry). Thereby, the output image at the top level is reconstructed. The lower levels are then reconstructed (by adder 100) by first forming the prediction using the transmitted blur information available over lines 84 from reconstruction circuitry 76 and then decoding the difference image and selectively adding it to the prediction image to form a new reconstructed image for that level. The process continues until the bottom level is reached and the bottom level image is transferred to the display frame buffer 98.

The arithmetic decoder which is used in a number of processes, that is, decoding the motion transform coefficients, the blur information, and the image information from lossy compressor 46, operates as is well known in the art. Since the non-zero locations were encoded using different probabilities depending upon which state the coder was in, the arithmetic decoder regenerates the state for each position in the location map as the decoding proceeds. The state, in combination with the encoded data, then determines whether or not a zero is used for each map location. Once the map indicating the location of non-zero values has been decoded, the B-bit values are decoded and incremented by one and placed in the appropriate positions in the map.

Looking in more detail at the generation of the resolution pyramids and decoding thereof, the process follows the inverse of the method used in lossy compressor 46. Thus, since the receiver decoding process follows the encoding process of the transmitter, the prediction at the top level is generated from the warped top level image. The quantizer indices are decoded using the arithmetic decoder and the quantized difference image is reconstructed from the quantizer indices and is then added to the prediction image to give the top level output image (corresponding to adder 522a and the output over lines 522 of the transmitter). At the lower levels, the prediction is formed by selectively adding the warped interpolation error to the interpolated output image from the next higher level (corresponding to adder 530 in the transmitter). That output image, and the warped image at the next output level, are interpolated to give images at the current level. The blur information is decoded using the arithmetic decoder and then, in each 8×8 block of the interpolated higher level output for which the blur code is zero, the difference between the current level warped image and the interpolated higher level warped image is added (corresponding to adder 538 of the transmitter).

At the lower levels, according to the preferred embodiment of the invention, the lattice threshold quantized information is decoded. Each 4×4 block having a non-zero map bit is decoded by first determining the shell numbers of the two 4×2 lattice coded vectors inside. The centroid is then found for each lattice not lying in Shell 0 and scaled by the attenuation value. The output image is thereafter formed by adding this reconstructed difference to the prediction. (This corresponds to the operation of the adder 540 of the transmitter.) The output image from the bottom level in the final reconstructed image is then transferred to the display frame buffer as the final output image.

The illustrated lossy compressor 46 can be implemented in hardware, in software, or in a combination thereof.

The hierarchical entropy coded lattice threshold quantization encoding method and apparatus described hereinabove can also be advantageously employed in connection with the transmission of a sequence of images in which motion compensation is not provided. In this instance, the estimated receiver image over, for example, lines 51 in FIG. 2 will be the reconstructed receiver image designated as the frame output of the frame buffer 44 over lines 64. Further, the input image over lines 22 and the estimated receiver image over lines 51 need not be individually decimated by lossy compressor 46 but can be, referring to FIG. 7, input to a difference circuitry 720, the output of which, representing the error signal at the receiver, can then be input to a lossy compressor for decimation and hierarchical lattice threshold quantization encoding in accordance with the invention described hereinabove. At the receiver, the motion compensator 99 and its related circuitry would similarly be eliminated if motion compensation were not employed. Similarly, the reconstruction circuitry 76 would be modified in accordance with the transmitter operation to reconstruct the error image representation over lines 84 when the circuitry of FIG. 7 is employed. These changes would be apparent to those practiced in the art.

The entropy coded, lattice threshold quantization can also be employed in coding other sequences of multidimensional data vectors having a uniform vector quantization. In particular, the simplifications detailed above can be employed with such data, and would be modified to take account of the probability density functions for the vector data.

Additions, subtractions, deletions, and other modifications of the preferred particular embodiments of the invention will be apparent to those skilled in the art and are within the scope of the following claims.

What is claimed is:

1. A method for encoding interframe error data, in an image transmission system, for transmitting a sequence of image frames, said method comprising the steps of decimating an interframe predicted image data for a current image frame for generating a prediction pyramid data structure having a plurality of decimation levels, decimating an uncoded current image data representing the uncoded current image frame for generating a current image pyramid data structure having said plurality of decimation levels, and applying hierarchical entropy coded, lattice threshold quantization encoding to said prediction and current image pyramid data structures on a selected level by level basis for generating an encoded data representation of the difference between the predicted image data and the uncoded current image data.

2. A method for encoding interframe error data, in an image transmission system, for transmitting a sequence of image frames, said method comprising the steps of decimating an interframe predicted image data for a current image frame for generating a prediction pyramid data structure having a plurality of decimation levels, decimating an uncoded current image data representing the uncoded current image frame for generating a current image pyramid data structure having said plurality of decimation levels, and applying hierarchical lattice threshold quantization encoding to said prediction and current image pyramid data structures on a selected level by level basis for generating an encoded data representation of the difference between the predicted image data and the uncoded current image data.

3. The method of claim 1 wherein said applying step comprises the steps of applying said hierarchical encoding to said data structures on a block-by-block basis, and blurring blocks of the difference representation when a predicted image data fails to adequately represent a block portion of said current image at a pyramid structure level.

4. The method of claim 1 wherein said applying step comprises the step of employing arithmetic coding for generating, in part, said encoded representation.

5. The method of claim 1 further comprising the steps of applying said encoding to said data structures of a level on a block-by-block basis, and shifting block location boundaries from frame to frame of said sequence of image frames for improving the encoding efficiency.

6. The encoding method of claim 1 further comprising the step of applying an E-8 lattice for said lattice threshold quantization.

7. The method of claim 1 wherein said applying step comprises the steps of subtracting, at a top level, the predicted image data structure from the current image data structure for generating a top level output image, forming a warped interpolation error data structure at the lower levels by taking the difference between the predicted image data at the lower level and the interpolated predicted image data at the next higher level, and forming a prediction image at each lower level by combining an interpolated output image of the next higher level with a warped interpolation error data structure at the lower level.

8. The method of claim 7 wherein said prediction forming step further comprises the step of interpolating the output image from the next higher level for generating said interpolated output image.

9. The method of claim 7 further comprising the step of
applying said lattice quantization and coding only to the prediction image error at a bottom plurality of levels of the pyramid data structures,
transmitting only blur information at the next to highest level, and
transmitting only a scalar quantization data at the top level of processing.

10. An apparatus for encoding interframe error data in an image transmission system for transmitting a sequence of image frames, said apparatus comprising
means for decimating an interframe predicted image data for a current image frame for generating a prediction pyramid data structure having a plurality of decimation levels,
means for decimating an uncoded current image data representing the uncoded current image frame for generating a current image pyramid data structure having said plurality of decimation levels, and
means for applying a hierarchical entropy coded, lattice threshold quantization encoding to said prediction and current image pyramid data structures on a selected level by level basis for generating an encoded data representation of the difference between the predicted image data and the uncoded current image data.

11. The apparatus of claim 10 wherein said applying means further comprises
means for applying said hierarchical encoding to said data structures on a block-by-block basis, and
means for blurring blocks of the difference representation when a predicted image data fails to adequately represent a block portion of said current image at a pyramid structure level.

12. The apparatus of claim 10 wherein said applying means further comprises
arithmetic coding means for generating, in part, said encoded representation.

13. The apparatus of claim 10 further comprising
means for applying said coding to said data structures of a level on a block-by-block basis, and
means for shifting block location boundaries from frame to frame of said sequence of image frames for improving encoding efficiency.

14. The encoding apparatus of claim 10 wherein said applying means further comprises
means for using an E-8 lattice for said threshold quantization encoding.

15. The apparatus of claim 10 wherein said applying means comprises
means for subtracting, at a top level, the predicted image data structure from the current image data structure for generating a top level output image,
means for forming a warped interpolation error data structure at the lower levels by taking the difference between the predicted image data at the lower level and the interpolated predicted image data at the next higher level, and
means for forming a prediction image at each lower level by combining an interpolated output image of the next higher level with a warped interpolation error data structure at the lower level.

16. A method for encoding interframe error data, in a motion compensation image transmission system, for transmitting a sequence of image frames, said method comprising the steps of
decimating an interframe predicted image data for a current image frame for generating a prediction pyramid data structure having a plurality of decimation levels,
decimating an uncoded current image data representing the uncoded current image frame for generating a current image pyramid data structure having said plurality of decimation levels, and
applying hierarchical entropy coded, lattice threshold quantization encoding to said prediction and current image pyramid data structures on a selected level by level basis for generating an encoded data representation of the difference between the predicted image data and the uncoded current image data.

17. The method of claim 16 wherein said applying step comprises the steps of
applying said hierarchical encoding to said data structures on a block-by-block basis, and
blurring blocks of the difference representation when a predicted image data fails to adequately represent a block portion of said current image at a pyramid structure level.

18. The method of claim 16 wherein said applying step comprises the step of
employing arithmetic coding for generating, in part, said encoded representation.

19. The method of claim 16 further comprising the step of
applying said encoding to said data structures of a level on a block-by-block basis, and
shifting block location boundaries from frame to frame of said sequence of image frames for improving the encoding efficiency.

20. The method of claim 16 wherein said applying step comprises the steps of
subtracting, at a top level, the predicted image data structure from the current image data structure for generating a top level output image,
forming a warped interpolation error data structure at the lower levels by taking the difference between the predicted image data at the lower level and the interpolated predicted image data at the next higher level, and
forming a prediction image at each lower level by combining an interpolated output image of the next higher level with a warped interpolation error data structure at the lower level.

21. The method of claim 20 wherein said prediction forming step further comprises the step of
interpolating the output image from the next higher level for generating said interpolated output image.

22. The method of claim 20 further comprising the step of
applying said entropy coded, lattice threshold quantization and coding only to the prediction image error at a bottom plurality of levels of the pyramid data structures,
transmitting only blur information at the next to highest level, and
transmitting only a scalar quantization data at the top level of processing.

23. An apparatus for encoding interframe error data in a motion compensation image transmission system for transmitting a sequence of image frames, said apparatus comprising means for decimating an interframe predicted image data for a current image frame for generating a prediction pyramid data structure having a plurality of decimation levels, means for decimating an uncoded current image data representing the uncoded current image frame for generating a current image pyramid data structure having said plurality of decimation levels, and means for applying a hierarchical entropy coded, lattice threshold quantization encoding to said prediction and current image pyramid data structures on a selected level by level basis for generating an encoded data representation of the difference between the predicted image data and the encoded current image data.

24. The apparatus of claim 23 wherein said applying means further comprises means for applying said hierarchical encoding to said data structures on a block-by-block basis, and means for blurring blocks of the difference representation when a predicted image data fails to adequately represent a block portion of said current image at a pyramid structure level.

25. The apparatus of claim 23 wherein said applying means further comprises arithmetic coding means for generating, in part, said encoded representation.

26. The apparatus of claim 23 further comprising means for applying said coding to said data structures of a level on a block-by-block basis, and means for shifting block location boundaries from frame to frame of said sequence of image frames for improving encoding efficiency.

27. The apparatus of claim 23 wherein said applying means comprises means for subtracting, at a top level, the predicted image data structure from the current image data structure for generating a top level output image, means for forming a warped interpolation error data structure at the lower levels by taking the difference between the predicted image data at the lower level and the interpolated predicted image data at the next higher level, and means for forming a prediction image at each lower level by combining an interpolated output image of the next higher level with a warped interpolation error data structure at the lower level.

28. A method for encoding interframe error data, in an image transmission system, for transmitting a sequence of image frames, said method comprising the steps of forming a difference image representing, on a pixel-by-pixel basis, the difference between a predicted image data for a current image frame and an uncoded current image data representing the uncoded current image frame, decimating said difference image for generating a difference image pyramid data structure having a plurality of decimation levels, and applying hierarchical entropy coded, lattice threshold quantization encoding to said difference image pyramid data structure on a selected level by level basis for generating an encoded data representation of the difference between the predicted image data and the uncoded current image data.

29. The method of claim 28 further comprising the step of forming said predicted image data using interframe motion compensation.

30. The method of claim 28 wherein said applying step comprises the steps of applying said hierarchical encoding to said data structures on a block-by-block basis, and blurring blocks of the predicted image representation when a predicted image data fails to adequately represent a block portion of said current image at a pyramid structure level.

31. The method of claim 28 wherein said applying step comprises the step of employing arithmetic coding for generating, in part, said encoded representation.

32. The method of claim 28 further comprising the step of applying said encoding to said data structures of a level on a block-by-block basis, and shifting block location boundaries from frame to frame of said sequence of image frames for improving the encoding efficiency.

33. The method of claim 28 wherein said applying step comprises the step of forming an interpolation error data structure at the lower levels by taking the difference between the difference image data at the lower level and an interpolated reconstructed difference image data at the next higher level.

34. A method for encoding interframe error data, in an image transmission system, for transmitting a sequence of image frames, said method comprising the steps of forming a difference image representing, on a pixel-by-pixel basis, the difference between a predicted image data for a current image frame and an uncoded current image data representing the uncoded current image frame, decimating said difference image for generating a difference image pyramid data structure having a plurality of decimation levels, and applying hierarchical lattice threshold quantization encoding to said difference image pyramid data structure on a selected level by level basis for generating an encoded data representation of the difference between the predicted image data and the uncoded current image data.

35. An apparatus for encoding interframe error data in an image transmission system for transmitting a sequence of image frames, said apparatus comprising means for forming a difference image representing, on a pixel-by-pixel basis, the difference between predicted image data for a current image frame and an uncoded current image data representing an uncoded current image frame, means for decimating said difference image for generating a difference image pyramid data structure having a plurality of decimation levels, and means for applying a hierarchical entropy coded, lattice threshold quantization encoding to said difference image pyramid data structure on a selected level by level basis for generating an encoded data representation of the difference between the predicted image data and the encoded current image data.

36. The apparatus of claim 35 further comprising means for forming said predicted image data using interframe motion compensation.

37. The apparatus of claim 35 wherein said applying means further comprises
 means for applying said hierarchical encoding to said data structures on a block-by-block basis, and
 means for blurring blocks of the predicted image representation when a predicted image data fails to adequately represent a block portion of said current image at a pyramid structure level.

38. The apparatus of claim 35 wherein said applying means further comprises
 arithmetic coding means for generating, in part, said encoded representation.

39. The apparatus of claim 35 further comprising
 means for applying said coding to said data structures of a level on a block-by-block basis, and
 means for shifting block location boundaries from frame to frame of said sequence of image frames for improving encoding efficiency.

40. The apparatus of claim 35 wherein said applying means comprises
 means for forming an interpolation error data structure at the lower levels by taking the difference between the difference image data at the lower level and an interpolated reconstructed difference image data at the next higher level.

41. An apparatus for encoding interframe error data in an image transmission system for transmitting an sequence of image frames, said apparatus comprising
 means for forming a difference image representing, on a pixel-by-pixel basis, the difference between predicted image data for a current image frame and an uncoded current image data representing an uncoded current image frame,
 means for decimating said difference image for generating a difference image pyramid data structure having a plurality of decimation levels, and
 means for applying a hierarchical lattice threshold quantization encoding to said difference image pyramid data structure on a selected level by level basis for generating an encoded data representation of the difference between the predicted image data and the encoded current image data.

42. A method for encoding interframe image data, in an image transmission system, for transmitting a sequence of image frames, said method comprising the steps of
 applying entropy coded, lattice threshold quantization encoding to said image data on a block-by-block basis, and
 shifting block location boundaries from frame to frame of said sequence of image frames for improving encoding efficiency.

43. The method of claim 42 wherein said shifting step comprises the step of
 shifting said block boundaries a plurality of picture elements in each of a plurality of axial directions defining an image plane.

44. An apparatus for encoding interframe image data, in an image transmission system, for transmitting a sequence of image frames, said apparatus comprising
 means for applying entropy coded, lattice threshold quantization encoding to said image data on a block-by-block basis, and
 means for shifting block location boundaries from frame to frame of said sequence of image frames for improving encoding efficiency.

45. The apparatus of claim 44 wherein said shifting means comprises
 means for shifting said block boundaries a plurality of picture elements in each of a plurality of axial directions defining an image plane.

46. An apparatus for encoding interframe error in an image transmission system for transmitting a sequence of image frames, said apparatus comprising
 means for decimating an interframe predicted image data for a current image frame for generating a prediction pyramid data structure having a plurality of decimation levels,
 means for decimating an uncoded current image data representing the uncoded current image frame for generating a current image pyramid data structure having said plurality of decimation levels, and
 means for applying a hierarchical lattice threshold quantization encoding to said prediction and current image pyramid data structures on a selected level by level basis for generating an encoded data representation of the difference between the predicted image data and the uncoded current image data.

47. A method for encoding a sequence of multidimensional data vectors comprising the steps of
 applying lattice threshold quantization encoding to said sequence of multidimensional data vectors for generating a sequence of closest lattice points to said data vectors,
 entropy encoding lattice point identifying data representing said sequence of closest lattice points, and
 delivering said entropy encoded data to a communication channel.

48. The method of claim 47 wherein said applying step comprises for each data vector, the steps of
 employing an E-8 lattice for said threshold quantization encoding,
 summing, over all said dimensions, the magnitude of the round-off error for a vector coordinate,
 determining the oddness or evenness of the sum of candidate lattice points for a vector, and
 determining the closest lattice point to the data vector.

49. The method of claim 47 further comprising the steps of
 indexing the identity of each lattice point within a selected range of shells, and
 entropy encoding said indices for transmission over said communication channel.

50. The method of claim 49 wherein said indexing step comprises the steps of
 pairing lattice points to form 4×4 blocks,
 identifying whether both lattice points fall in Shell 0 of the lattice,
 encoding the shell numbers for all points not in Shell 0, and
 identifying the index of each lattice point not within Shell 0 using symmetries of the lattice index identifiers.

51. The method of claim 50 wherein said index identifying step comprises
 identifying, for groups of lattice points, a parent centroid index, and
 using spatial symmetries to identify variations of the parent centroid index.

52. The method of claim 51 further comprising the step of
 explicitly transmitting lattice point coordinates for points lying in Shell 3 or a higher level shell.

53. Apparatus for encoding a sequence of multidimensional data vectors comprising
- means for applying lattice threshold quantization encoding to said sequence of multidimensional data vectors for generating a sequence of closest lattice points to said data vectors,
- means for entropy encoding lattice point identifying data representing said sequence of closest lattice points, and
- means for delivering said entropy encoded data to a communication channel.

54. The apparatus of claim 53 wherein said applying means comprises, for each data vector,
- means for employing an E-8 lattice for said threshold quantization encoding,
- means for summing, over all dimensions, the magnitude of the round-off error for a vector coordinate,
- means for determining the oddness or evenness of the sum of candidate lattice points for a vector, and
- means for determining the closest lattice point to the data vector.

55. The apparatus of claim 53 further comprising
- means for indexing the identity of each lattice point within a selected range of shells, and
- means for entropy encoding said indices for transmission over said communication channel.

56. The apparatus of claim 55 wherein said indexing means comprises
- means for pairing lattice points to form 4×blocks,
- means for identifying whether both lattice points fall in Shell 0 of the lattice,
- means for encoding the shell numbers for all points not in Shell 0, and
- means for identifying the index of each lattice point not within Shell 0 using symmetries of the lattice index identifiers.

57. The apparatus of claim 56 wherein said index identifying means comprises
- means for identifying, for groups of lattice points, a parent centroid index, and
- means for using spatial symmetries to identify variation of the parent centroid index.

58. The apparatus of claim 57 further comprising
- means for explicitly transmitting lattice point coordinates for points lying in Shell 3 or a higher level shell.

* * * * *